US008098505B1

(12) United States Patent
Choi

(10) Patent No.: US 8,098,505 B1
(45) Date of Patent: Jan. 17, 2012

(54) PHASE MANAGEMENT FOR INTERLEAVED POWER FACTOR CORRECTION

(75) Inventor: Hangseok Choi, Bedford, NH (US)

(73) Assignee: Fairchild Semiconductor Corporation, South Portland, ME (US)

( * ) Notice: Subject to any disclaimer, the term of this patent is extended or adjusted under 35 U.S.C. 154(b) by 203 days.

(21) Appl. No.: 12/506,098

(22) Filed: Jul. 20, 2009

(51) Int. Cl.
*H02M 1/42* (2007.01)
*H02M 7/23* (2006.01)

(52) U.S. Cl. .............................. 363/89; 363/70; 323/272

(58) Field of Classification Search .................. 323/222, 323/272; 363/70, 81, 89
See application file for complete search history.

(56) References Cited

U.S. PATENT DOCUMENTS

| 6,091,233 | A * | 7/2000 | Hwang et al. | 323/222 |
| 7,795,915 | B2 * | 9/2010 | Candage et al. | 326/59 |
| 7,884,588 | B2 * | 2/2011 | Adragna et al. | 323/272 |
| 2009/0257258 | A1 * | 10/2009 | Ayukawa et al. | 363/89 |
| 2009/0267658 | A1 * | 10/2009 | Bridge et al. | 327/141 |
| 2010/0052641 | A1 * | 3/2010 | Popescu et al. | 323/300 |

OTHER PUBLICATIONS

Grote, T., et al., "Semi-Digital Interleaved PFC Control with Optimized Light Load Efficiency," Applied Power Electronics Conference and Exposition, 2009. APEC 2009. Twenty-Fourth Annual IEEE, pp. 1722-1727, Feb. 15-19, 2009. doi: 10.1109/APEC.2009. 4802902 URL: http://ieeexplore.ieee.org/stamp/stamp.jsp?tp=&arnumber=4802902&isnumber=4802613.*
Laughton, M.A., et al. (2003). Electrical Engineer's Reference Book (16th Edition), pp. 14/21-14-22. Elsevier. Online version available at: http://www.knovel.com/web/portal/browse/display?_EXT_KNOVEL_DISPLAY_bookid=1712&VerticalID=0.*
Wang, T. et al., "Light load efficiency improvement for multi-channel PFC," Power Electronics Specialists Conference, 2008. PESC 2008. IEEE, pp. 4080-4085, Jun. 15-19, 2008. doi: 10.1109/PESC.2008. 4592592 URL: http://ieeexplore.ieee.org/stamp/stamp.jsp?tp=&arnumber=4592592&isnumber=4591876.*
FAN9612—Interleaved Dual BCM PFC Controller, pp. 1-36, 2008 Fairchild Semiconductor Corporation.

* cited by examiner

*Primary Examiner* — Adolf Berhane
*Assistant Examiner* — Fred E Finch, III
(74) *Attorney, Agent, or Firm* — Okamoto & Benedicto LLP

(57) ABSTRACT

An interleaved power factor correction (PFC) circuit includes phase management to control shedding and adding of channels. The channels may be voltage (e.g., boost) converters connected in parallel. The interleaved PFC circuit can have a first channel and a second channel that operate out of phase of each other to provide input power to a load. In a two phase interleaved PFC circuit, the first and second channels operate 180 degrees out of phase. A channel may be shed or added depending on load conditions. The phase management can be configured to add or remove a channel only when the AC line input to the interleaved PFC circuit crosses zero.

12 Claims, 9 Drawing Sheets

PHASE MANAGEMENT FOR INTERLEAVED POWER FACTOR CORRECTION

BACKGROUND OF THE INVENTION

1. Field of the Invention

The present invention relates generally to electrical circuits, and more particularly but not exclusively to power factor correction.

2. Description of the Background Art

Power factor is the ratio of real power to apparent power delivered to a load, represented as a number between 0 and 1. Generally speaking, a load with low power factor draws more power than a load with high power factor. As its name implies, power factor correction (PFC) involves correcting the power factor of a load to a high value, which is ideally as close to 1.0 as possible. High power factor is achieved when the input current of a power supply is sinusoidal and in phase with the line voltage. A PFC converter shapes the input current to achieve almost unity power factor.

Boundary conduction mode (BCM) (also known as "critical conduction mode") boost PFC converters have been widely used in low power applications because they are more efficient and cost effective than continuous conduction mode (CCM) boost PFC converters. These benefits result from elimination of reverse-recovery losses of the boost diode and turning ON the boost switch with zero-voltage switching (ZVS) or near ZVS (also referred to as "valley switching"). However, the BCM approach exhibits a relatively large peak inductor current, which is twice of its average value and accordingly requires a larger differential mode electro-magnetic interference (EMI) filter than the CCM approach. This offsets the benefits of the BCM approach, limiting the applicable practical power level of BCM PFC circuits below 300 W.

Recently, interleaved BCM PFC circuits have become more popular because of their ability to reduce the input current ripple and, consequently, the size of the EMI filter, extending their applicable practical power level above 300 W. In addition, the output current ripple can be also significantly reduced by the ripple cancellation effect of interleaving, which allows longer life time of the output capacitor. Another benefit of the interleaving approach is that light load efficiency can be improved by shutting down one channel of interleaved converters at light load condition. This is known as "phase management." By shutting down one of parallel connected converters, the switching loss and MOSFET gate drive loss can be reduced to improve energy efficiency at light load conditions.

The present invention provides phase management to interleaved PFC circuits to minimize line current distortion during adding or shedding of channels. This is particularly important in display applications, such as televisions and computer monitors, where glitch in the line current may result in visible noise on the screen. The present invention also allows small hysteresis for the phase management threshold regardless of the ripple of compensation voltage, resulting in tight control of the power level for channel adding and shedding. The present invention may be employed in currently available or new interleaved PFC circuits.

SUMMARY

In one embodiment, an interleaved power factor correction (PFC) circuit includes phase management to control shedding and adding of channels. The channels may be voltage (e.g., boost) converters connected in parallel. The interleaved PFC circuit can have a first channel and a second channel that operate out of phase of each other to provide input power to a load. In a two phase interleaved PFC circuit, the first and second channels operate 180 degrees out of phase. A channel may be shed or added depending on load conditions. The phase management can be configured to add or remove a channel only when the AC line input to the interleaved PFC circuit crosses zero.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
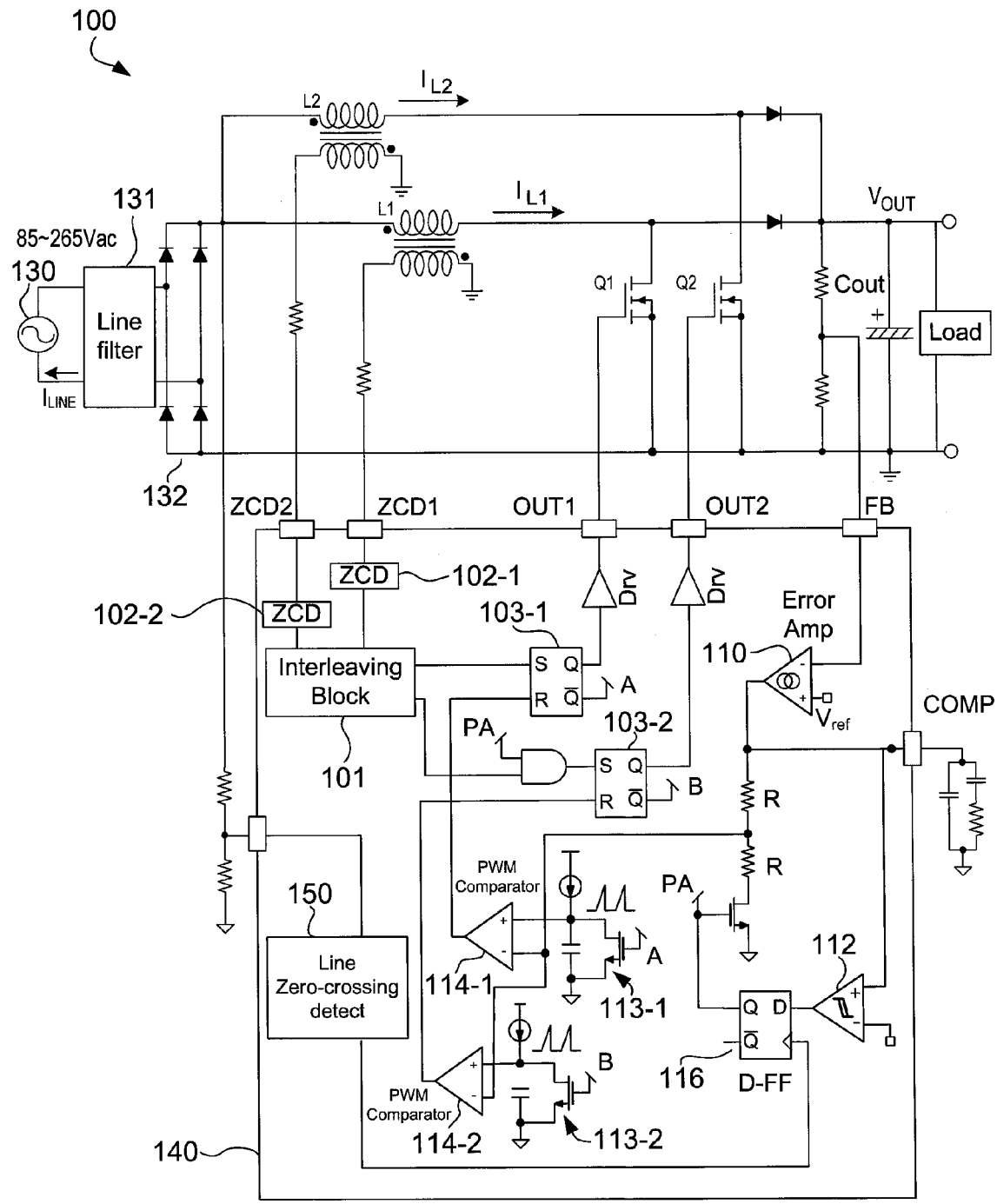
FIG. 1 shows a schematic diagram of an interleaved PFC circuit in accordance with an embodiment of the present invention.

FIG. 1 shows a schematic diagram of an interleaved PFC circuit 100 in accordance with an embodiment of the present invention. As will be more apparent below, the PFC circuit 100 is interleaved in that it has a plurality of channels that operate in different phases. In the example of FIG. 1, the PFC circuit 100 has two channels, each comprising a boost converter. The boost converters are connected in parallel and are locked to operate 180 degrees out of phase. Accordingly, the PFC circuit 100 has two out of phase interleaved channels that deliver input power to the load.

In the example of FIG. 1, an AC line power source (e.g., 85 to 265 VAC) 130 is filtered by a line filter 131 and rectified by a full bridge rectifier 132 for presentation to a load coupled to the output voltage $V_{OUT}$ across the output capacitor $C_{OUT}$. A first channel comprising a first boost converter includes an inductor L1, a drive transistor Q1, and a pulse width modulator (PWM) block 113-1. A second channel comprising a second boost converter includes an inductor L2, a drive transistor Q2, and PWM block 113-2. As shown in FIG. 1, the first and second boost converters are connected in parallel. The control portion of the PFC circuit 100 may be implemented as an integrated circuit in the form of a PFC controller 140.

An interleaving block 101 comprises an electrical circuit configured to interleave the operation of the first and second boost converters such that they are locked to operate 180 degrees out of phase of each other. A zero crossing detector 102-1 detects the zero crossing of inductor current $I_{L1}$ by monitoring inductor auxiliary winding voltage. Similarly, a zero crossing detector 102-2 detects the zero crossing of inductor current $I_{L2}$ by monitoring inductor auxiliary winding voltage. The interleaving block 101 receives the detection outputs of the detectors 102-1 and 102-2 to set either the SR-FF (i.e., Set-Reset Flip-Flop) 103-1 or SR-FF 103-2 depending on which of the detectors 102 detecs a zero crossing of its corresponding inductor current. In one embodiment, the interleaving block 101 sets the SR-FF 103-1 to switch ON the transistor Q1 and sets the SR-FF 103-2 to switch ON the transistor Q2 such that transistors Q1 and Q2 run 180 degrees out of phase based on the zero crossings of the inductor currents $I_{L1}$ and $I_{L2}$. In the example of FIG. 1, switching ON a drive transistor (i.e., transistor Q1 or Q2) allows the inductor of the corresponding channel to build up current; switching OFF a drive transistor forces the inductor current of the corresponding channel to be discharged to zero. By controlling the ON time of the drive transistors Q1 and Q2, the amount of current delivered to the load can be controlled.

An error amplifier 110 compares the monitored output voltage $V_{OUT}$ to a reference voltage $V_{REF}$ to generate a resulting compensation voltage $V_{COMP}$. In the example of FIG. 1, the monitored output voltage is presented at the FB pin of the PFC controller 140. As can be appreciated, the compensation voltage $V_{COMP}$ is indicative of the output power of the PFC circuit 100 because the turn ON times of the transistors Q1 and Q2 are dictated by the compensation voltage $V_{COMP}$. In the example of FIG. 1, because the monitored output voltage is input to the negative input of the error amplifier 110, a high compensation voltage $V_{COMP}$ indicates that the load is drawing high current from the PFC circuit 100. For the same reason, a low compensation voltage $V_{COMP}$ indicates that the load is drawing low current from the PFC circuit 100.

Each PWM block 113 (i.e., 113-1 or 113-2) includes a PWM comparator 114 (i.e., 114-1 or 114-2) that compares the compensation voltage $V_{COMP}$ to an artificial ramp signal to determine the ON time of the corresponding drive transistor for pulse width modulation. The artificial ramp signals of the PWM blocks 113-1 and 113-2 are 180 degrees out of phase.

As a particular example, the PWM comparator 114-1 of the first boost converter compares the compensation voltage $V_{COMP}$ to a first ramp signal. The PWM comparator 114-1 switches OFF the drive transistor Q1 by asserting the reset input of the SR-FF 103-1 when the first ramp signal increases above the compensation voltage $V_{COMP}$. The SR-FF 103-1 enables the PWM comparator 114-2 (see signal A from the SR-FF 103-1 reset output to the enable input of the PWM block 113-2) when the drive transistor Q1 is switched OFF. Similarly, the PWM comparator 114-2 of the second boost converter compares the compensation voltage $V_{COMP}$ to a second ramp signal. The PWM comparator 114-2 switches OFF the drive transistor Q2 by asserting the reset input of the SR-FF 103-2 when the second ramp signal increases above the compensation voltage $V_{COMP}$. The SR-FF 103-2 enables the PWM comparator 114-1 (see signal B from the SR-FF 103-2 Q-NOT output to the enable input of the PWM block 113-1) when the drive transistor Q2 is switched OFF.

The PFC circuit 100 includes a phase management circuit comprising a line zero-crossing detector 150, a phase management comparator 112, and a D-FF (i.e., Data Flip-Flop) 116. In the example of FIG. 1, the phase management comparator 112 compares the compensation voltage $V_{COMP}$ to either a phase add voltage $V_{PA}$ or a phase shed voltage $V_{PS}$ depending on whether the compensation voltage $V_{COMP}$ is increasing or decreasing. The phase add voltage $V_{PA}$ and phase shed voltage $V_{PS}$ represent the upper and lower thresholds, respectively, of hysteresis of the phase management comparator 112. The PFC circuit 100 is configured to increase the ON time of the remaining channel when the other channel is shed so that the input power to the load does not change after the other channel is shed. When adding a channel, the PFC circuit 100 is configured to reduce the ON time of the currently operating channel so that the input power to the load does not change after the channel is added. Phase management advantageously allows for improved efficiency by shudding down one of the channels during light loads.

The output voltage VOUT will rise under light load conditions i.e., when the load is not drawing much current from the PFC circuit 100. In that case, the compensation voltage VCOMP will decrease. When the compensation voltage VCOMP decreases below the phase shed voltage VPS, the phase management comparator 112 will output a logical LOW to the D-FF 116. In turn, the D-FF 116 outputs a logical LOW to de-assert the phase add signal PA. When the phase add signal PA is de-asserted, the SR-FF 103-2 is prevented from being set by the AND gate on its S input. This sheds (i.e., removes) the second boost converter from operation, preventing the second boost converter from delivering input power to the load. The PFC circuit 100 operates with a single boost converter at this time.

The second boost converter is added back to operation when the load starts drawing more current from the PFC circuit 100. As the current demand of the load increases, the output voltage $V_{OUT}$ starts to decrease. This causes the compensation voltage $V_{COMP}$ to increase. When the compensation voltage $V_{COMP}$ increases above the phase add voltage $V_{PA}$, the phase management comparator 112 will output a logical HIGH to the D-FF 116. In turn, the D-FF 116 outputs a logical HIGH to assert the phase add signal PA. When the phase add signal PA is asserted, the SR-FF 103-2 is once again enabled to be set, adding the second boost converter back in operation and returning the PFC circuit 100 to two channel operation.

The line zero-crossing detector 150 comprises an electrical circuit configured to detect the zero crossing of the line voltage of the AC line source 130. As can be appreciated, because power factor correction involves making the line current in-phase with the line voltage, the zero crossing of the line current (instead of the line voltage) may also be detected. In the example of FIG. 1, the line zero-crossing detector 150 detects when the AC line voltage crosses zero. When the AC line voltage is zero, the line zero-crossing detector 150 clocks the D-FF 116 to accept an input from the phase management comparator 112. The D-FF 116 otherwise does not respond to the phase management comparator 112. This way, channel adding or channel shedding can only occur during zero crossings of the AC line voltage (or current depending on implementation). Limiting channel adding or channel shedding only during zero crossings of the AC line current or voltage prevents the 120 Hz ripple on the compensation voltage $V_{COMP}$ from affecting phase management. This advantageously minimizes AC line current distortion during transient portions of the phase management.

Figure 2:
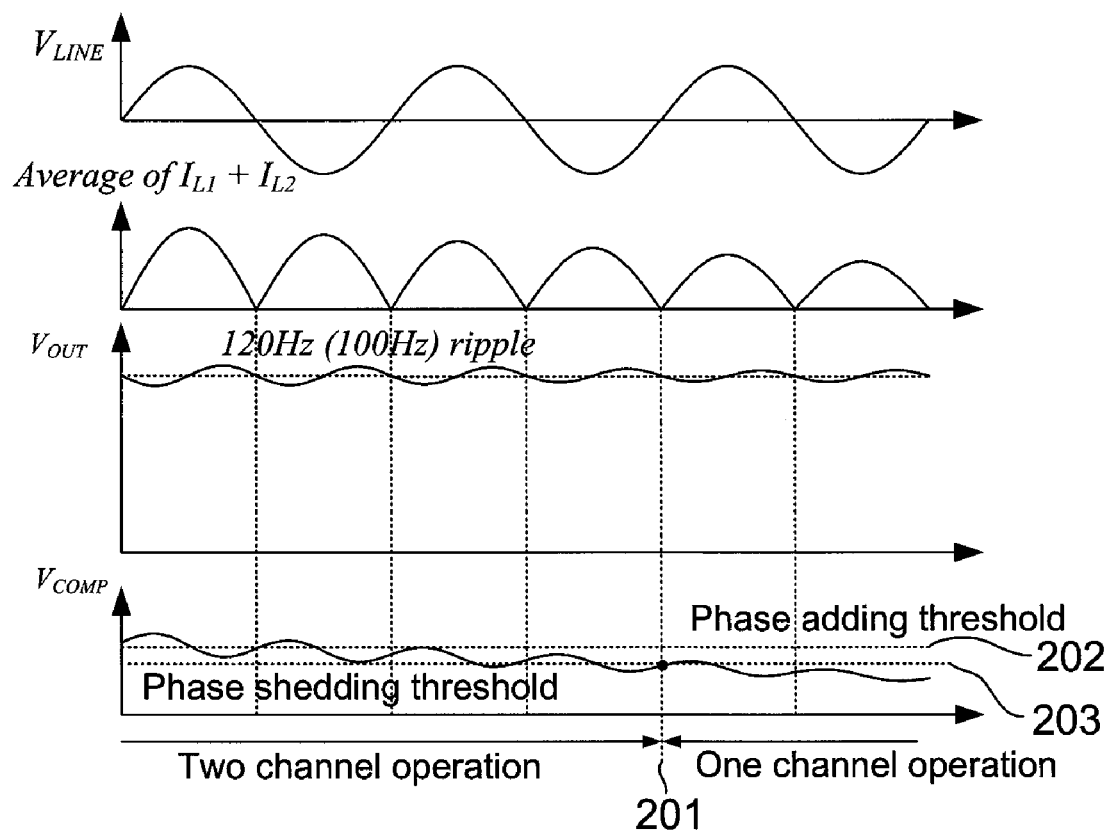
FIG. 2 shows example waveforms of the interleaved PFC circuit of FIG. 1.

FIG. 2 shows example waveforms of the PFC circuit 100. FIG. 2 shows, from top to bottom, the line voltage $V_{Line}$ of the AC line source 130, the average of the inductor currents $I_{L1}+I_{L2}$, the output voltage $V_{OUT}$, and the compensation voltage $V_{COMP}$ as a function of time. Superimposed on the waveform of the compensation voltage $V_{OUT}$ are the phase shedding (see 203) and phase adding (see 204) thresholds, which constitute the hysteresis of the phase management comparator 112. Advantageously, note that the hysteresis of the phase management comparator 112 does not have to be larger than the ripple of the compensation voltage $V_{COMP}$.

The average of the inductor currents $I_{L1}$ and $I_{L2}$ is zero at zero crossings of the AC line source 130. As shown in FIG. 2, when the compensation voltage $V_{COMP}$ decreases below the phase shedding threshold at a point when the average of the inductor currents $I_{L1}$ and $I_{L2}$ is zero (see 201), the PFC circuit 100 transitions from two channel operation using both converters to single channel operation using a single converter. Further note that the AC line voltage $V_{LINE}$ is zero when the average of the inductor currents $I_{L1}+_{L1}$ is zero. That is, the transition from two channel to single channel operation, or vice versa, occurs only during the zero crossings of the AC line source 130.

Figure 3:
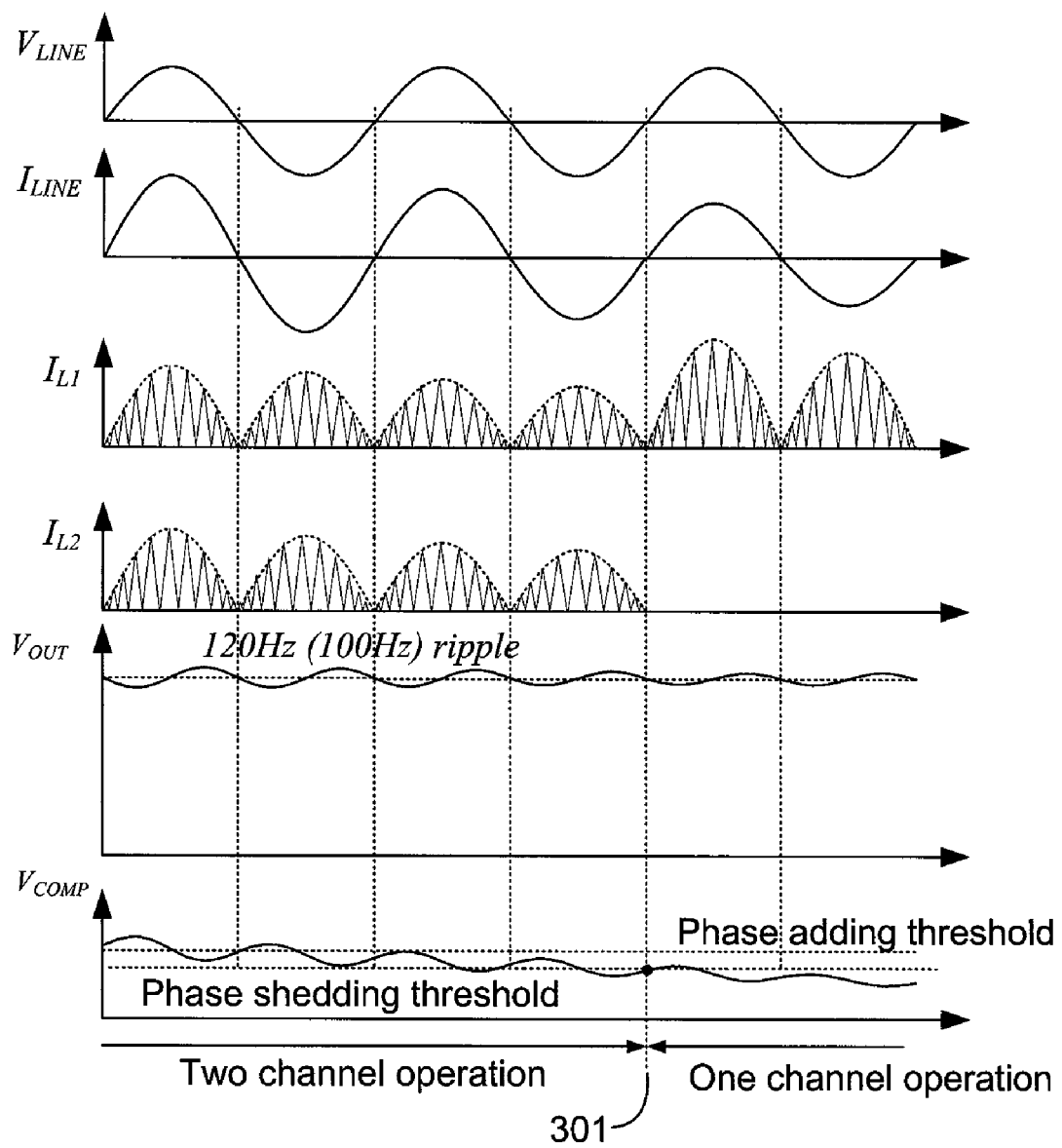
FIG. 3 shows example waveforms of the PFC circuit of FIG. 1 illustrating shedding of a channel in accordance with an embodiment of the present invention.

FIG. 3 shows example waveforms of the PFC circuit 100 illustrating shedding of a channel in accordance with an embodiment of the present invention. FIG. 3 shows, from top to bottom, the line voltage $V_{Line}$ of the AC line source 130, the line current $I_{LINE}$ of the AC line source 130, the inductor current $I_{L1}$, the inductor current $I_{L2}$, the output voltage $V_{OUT}$, and the compensation voltage $V_{COMP}$ as a function of time. In FIG. 3, the PFC circuit 100 transitions from two channel operation to single channel operation (see 301) when the compensation voltage $V_{COMP}$ decreases below the phase shedding threshold. Note the flow of both inductor current $I_{L1}$ and inductor current $I_{L2}$ during two channel operation. This is due to the operation of both converters to provide the two phases. When one of the channels is shed, which in this example controls the drive transistor Q2, the flow of inductor current $I_{L2}$ is stopped. The transition from two channel operation to one channel operation can only occur during zero crossings of the AC line voltage or current to minimize line current distortion during phase transitions (i.e., from one channel operation to two channel operation, or vice versa).

Figure 4:
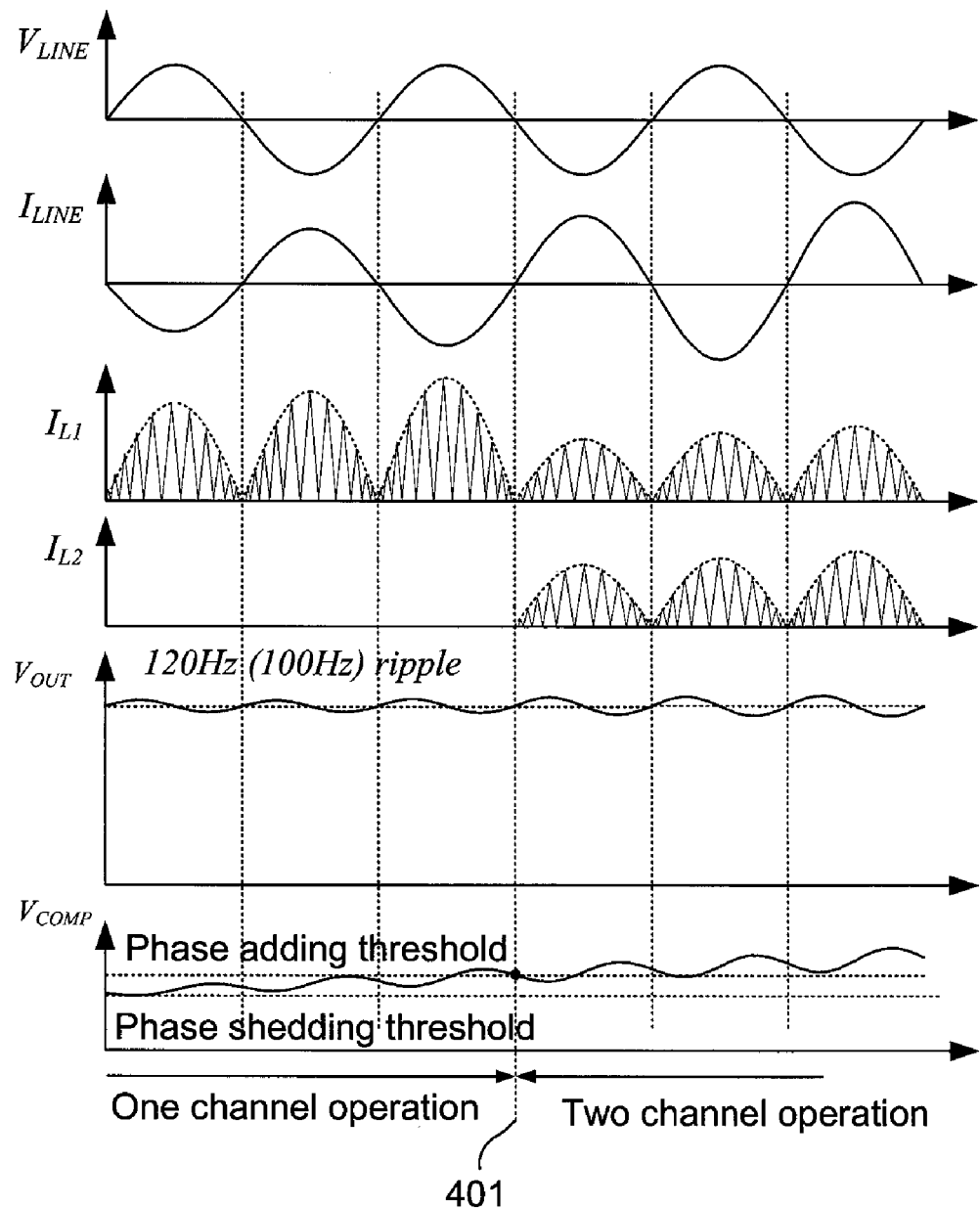
FIG. 4 shows example waveforms of the PFC circuit of FIG. 1 illustrating adding of a channel in accordance with an embodiment of the present invention.

FIG. 4 shows example waveforms of the PFC circuit 100 illustrating adding of a channel in accordance with an embodiment of the present invention. FIG. 4 shows, from top to bottom, the line voltage $V_{Line}$ of the AC line source 130, the line current $I_{LINE}$ of the AC line source 130, the inductor current $I_{L1}$, the inductor current $I_{L2}$, the output voltage $V_{OUT}$, and the compensation voltage $V_{COMP}$ as a function of time. In FIG. 4, the PFC circuit 100 transitions from one channel operation to two channel operation (see 401) when the compensation voltage $V_{COMP}$ increases above the phase adding threshold. Note that only the inductor current $I_{L1}$ flows during one channel operation because only the first converter operates at this time. When the other channel is added back, which in this example is the channel controlling the drive transistor Q2, both of the inductor currents $I_{L1}$ and $I_{L2}$ flow again. The transition from one channel operation to two channel operation can only occur during zero crossings of the AC line voltage or current to minimize line current distortion during phase transitions.

Figure 5:
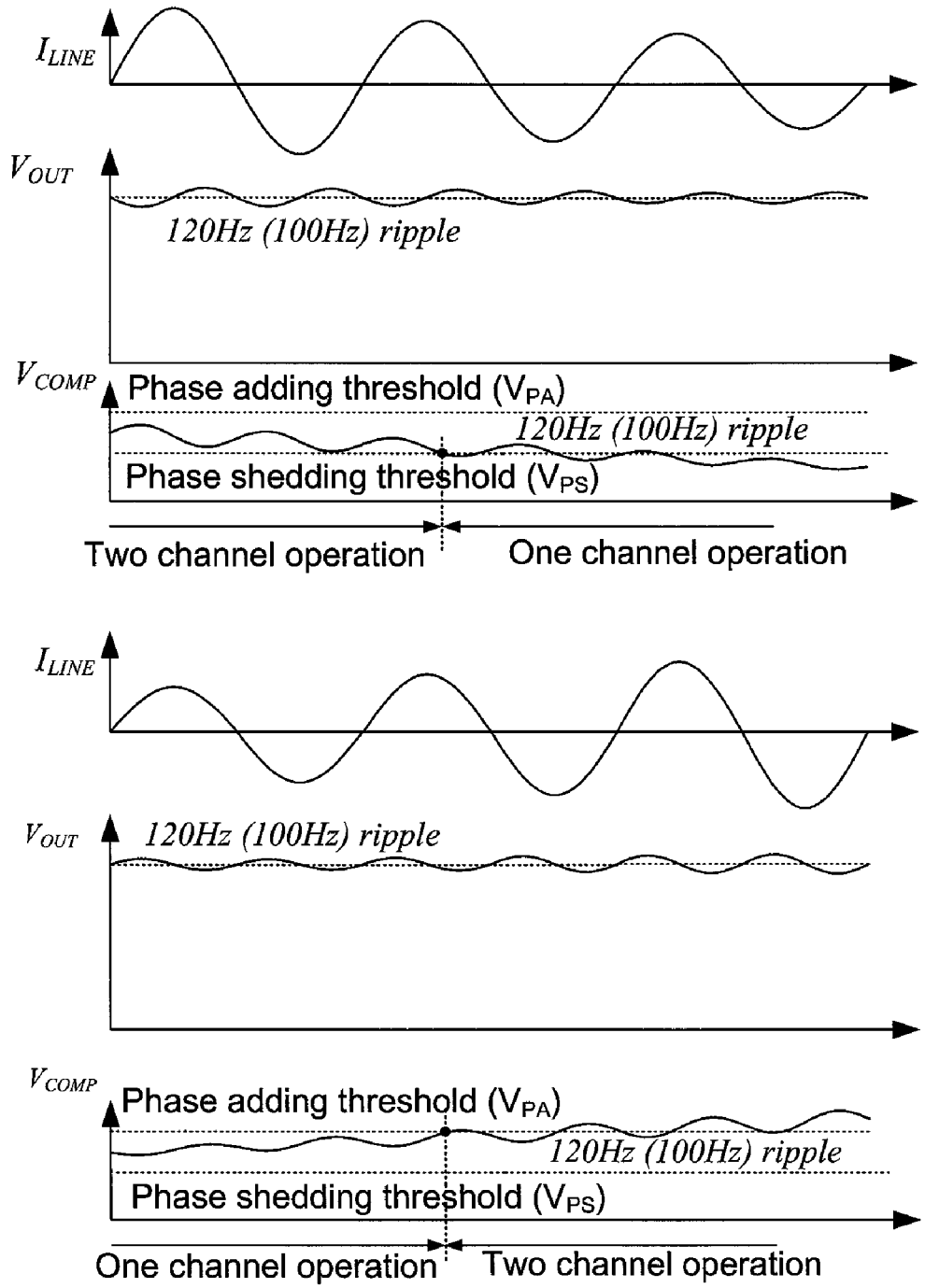
FIG. 5 shows example waveforms of a conventional interleaved PFC circuit that does not employ the phase management techniques of the present invention.

FIG. 5 shows example waveforms of a conventional interleaved PFC circuit that does not employ the phase management techniques of the present invention. FIG. 5 shows, from top to bottom, the line current $I_{LINE}$ of the AC line source, the output voltage $V_{OUT}$, and the compensation voltage $V_{COMP}$ as a function of time for the transition from two channel operation to one channel operation. These waveforms are followed by the line current $I_{LINE}$ of the AC line source, the output voltage $V_{OUT}$, and the compensation voltage $V_{COMP}$ as a function of time for the transition from one channel operation to two channel operation. In FIG. 5, the conventional interleaved PFC circuit transitions from one channel to two channel operation, and vice versa, even when the AC line current is not at zero crossing. The conventional PFC circuit performs phase transitions without regard to zero crossing of the AC line source.

Figure 6:
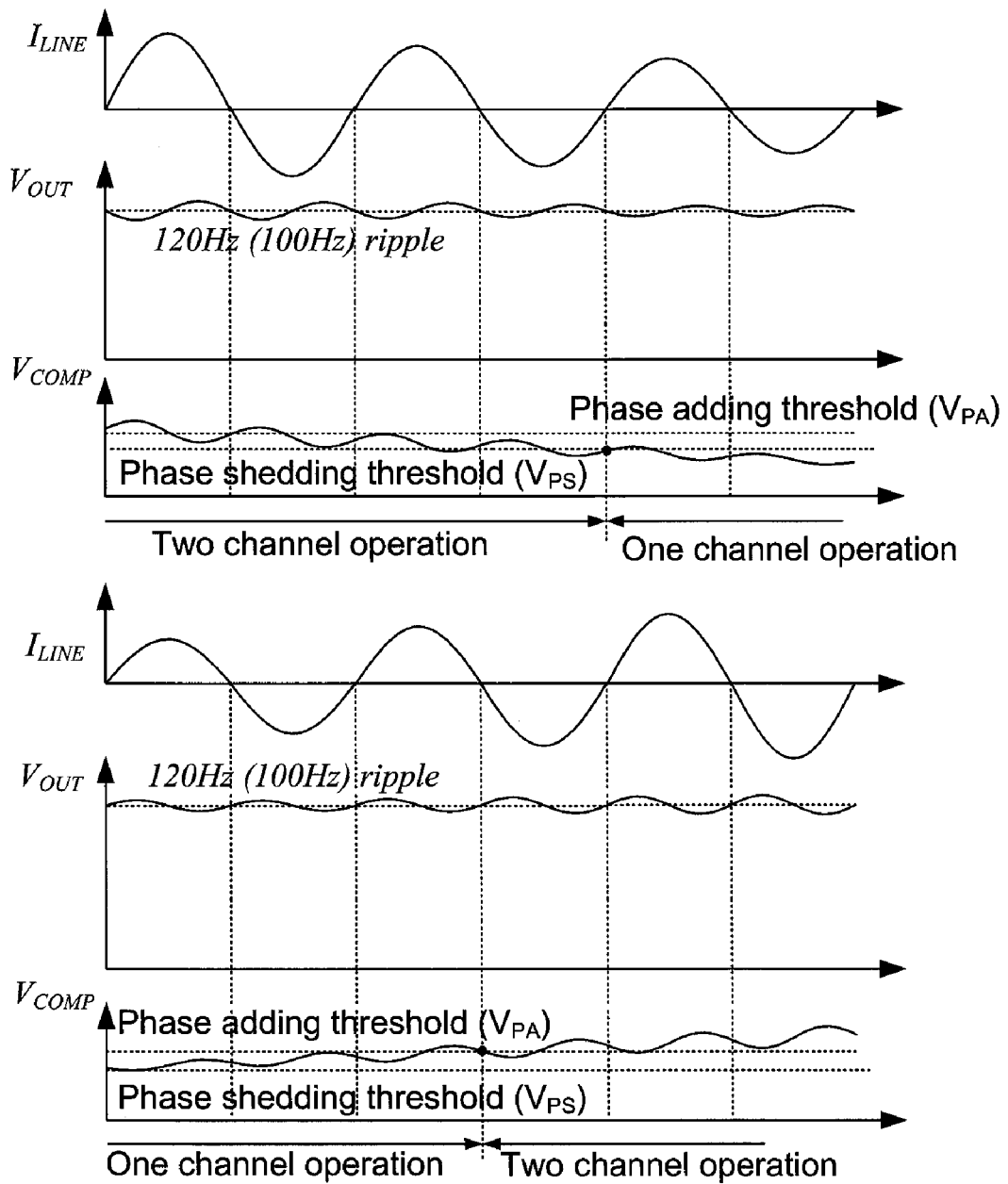
FIG. 6 shows example waveforms of the PFC circuit of FIG. 1 for comparison to FIG. 5.

FIG. 6 is shown alongside FIG. 5 for direct comparison. FIG. 6 shows example waveforms of the PFC circuit 100. FIG. 6 shows, from top to bottom, the line current $I_{LINE}$ of the AC line source 130, the output voltage $V_{OUT}$, and the compensation voltage $V_{COMP}$ as a function of time for the transition from two channel operation to one channel operation. These waveforms are followed by the line current $I_{LINE}$ of the AC line source 130, the output voltage $V_{OUT}$, and the compensation voltage $V_{COMP}$ as a function of time for the transition from one channel operation to two channel operation.

In general, regardless of the ripple on the compensation voltage $V_{COMP}$, phase management allows for channel shedding and adding without changing power levels delivered to the load. Power levels for channel shedding and adding can have very small hysteresis. However, conventional interleaved PFC circuits require hsyteresis larger than the ripple voltage to guarantee stable operation. As a result, to meet energy efficiency requirements, conventional interleaved PFC circuits may have to operate with a single converter up to a relatively high operating point, reducing the ripple cancellation benefits of interleaving and requiring a large EMI filter. In marked contrast, the hysteresis of the phase management of the PFC circuit 100 is relatively small compared to that of conventional interleaved PFC circuits.

Figure 7:
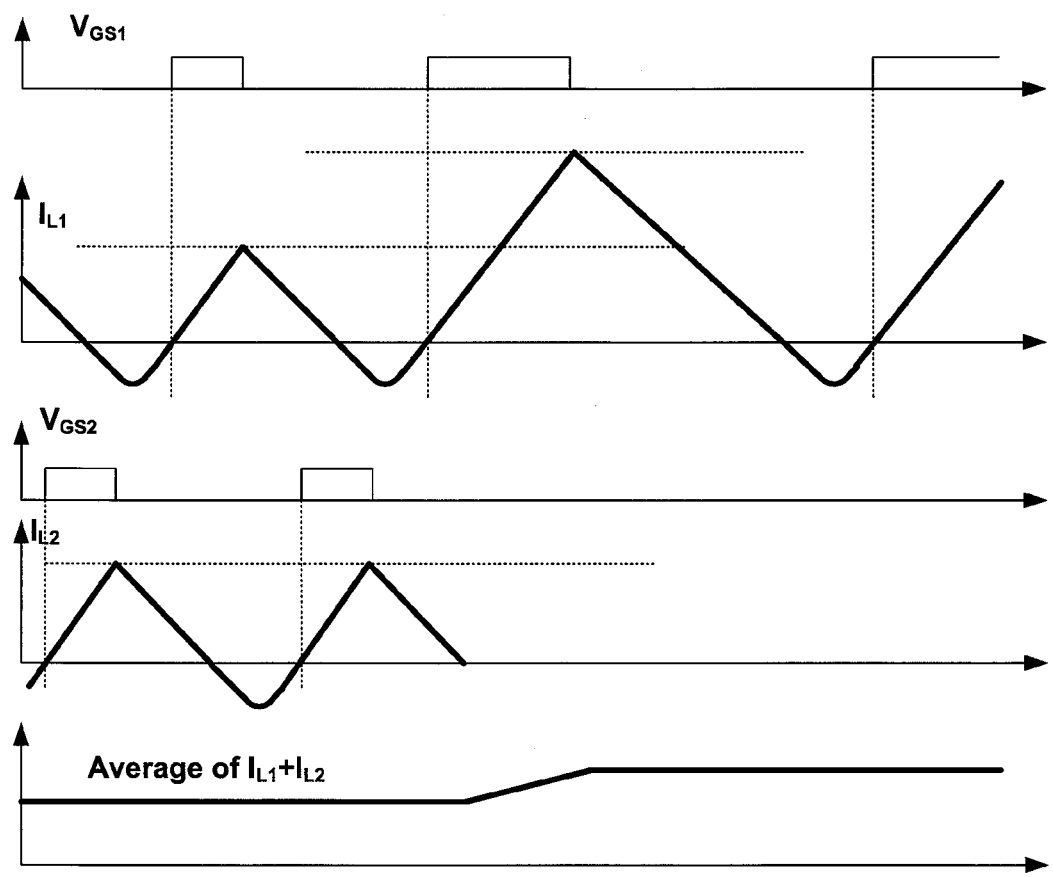
FIGS. 7 and 8 show waveforms of a conventional interleaved PFC circuit.
Figure 8:
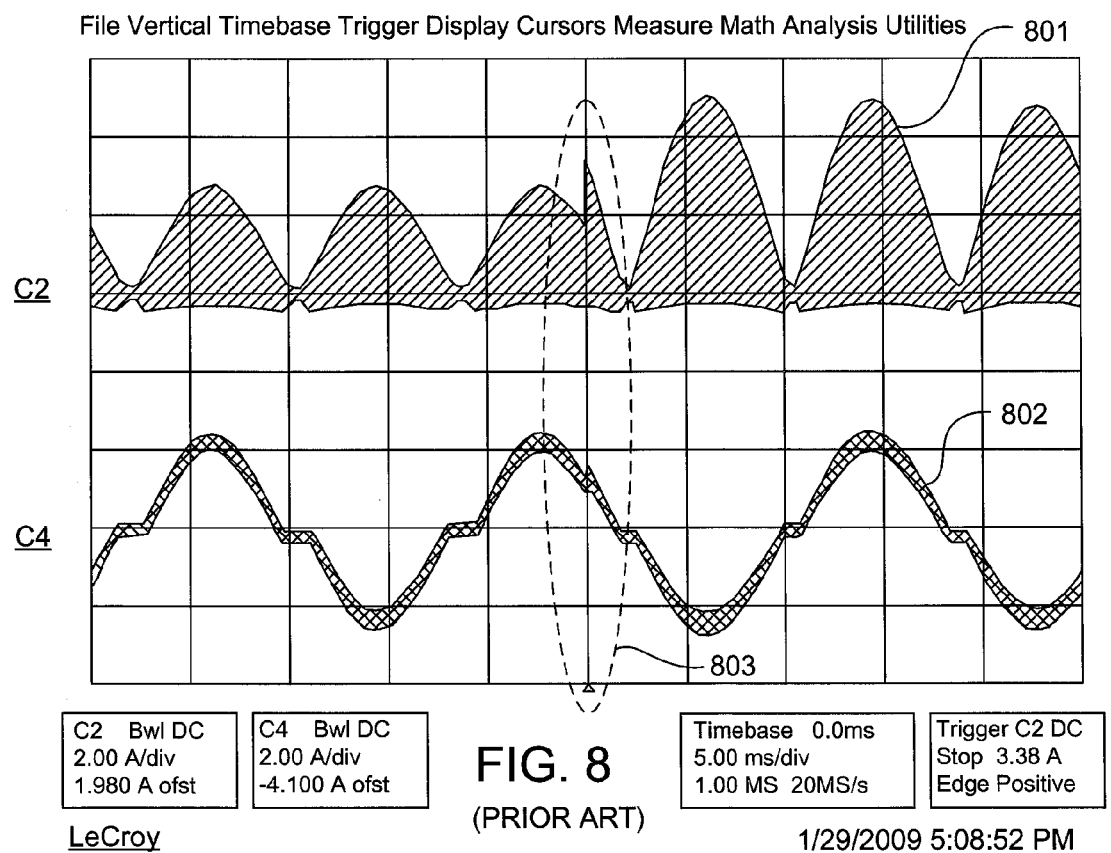

FIGS. 7 and 8 show waveforms of a conventional interleaved PFC circuit. FIG. 7 shows, from top to bottom, a gate voltage $V_{GS1}$ for controlling the drive transistor of the first channel, the inductor current $I_{L1}$ of the first channel, a gate voltage $V_{GS2}$ for controlling the drive transistor of the second channel, the inductor current $I_{L2}$ of the second channel, and the average of the inductor currents $I_{L1}$ and $I_{L2}$. Once inductor current reaches zero, there is some negative current in the inductor due to the resonance between the inductor and parasitic capacitance. Because of this, the average of the inductor currents is not directly proportional to the ON time of the drive transistor. Even though the drive transistor ON time is doubled or halved when a channel is shedded or added, the average inductor current is not exactly doubled or halved. In FIG. 7, the control voltage $V_{GS2}$ is switched OFF to shed one channel.

FIG. 8 shows the waveforms of the resulting average of the inductor currents $I_{L1}$ and $I_{L2}$ (see 801) and the AC line current (see 802). Note the distortion on the AC line current during phase transition when one channel is shed (see 803). This is because in a conventional interleaved PFC circuit, the sum of average inductor currents may change during phase management transitions even though the ON time of a drive transistor is doubled or halved when shedding or adding due to reverse current through the inductor. The PFC circuit 100 minimizes AC line current distortion by enabling phase management transitions only during zero crossings of the AC line current or voltage. In the example of FIG. 1, the PFC circuit does so by enabling the phase management comparator 112 only during zero crossings of the AC line voltage.

Figure 9:
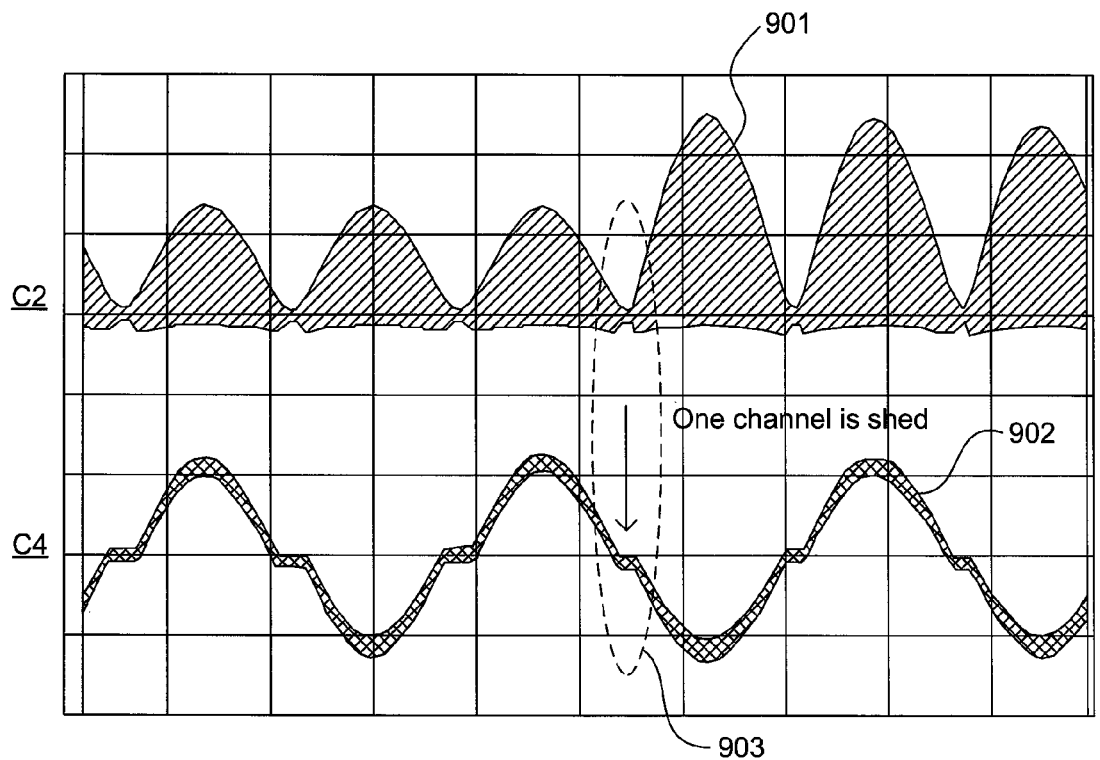
FIG. 9 shows example waveforms of the PFC circuit of FIG. 1 for comparison to FIG. 8.

FIG. 9 shows example waveforms of the PFC circuit 100. FIG. 9 shows the average of the inductor currents $I_{L1}$ and $I_{L2}$ (see 901) and the AC line current (see 902). In comparison to FIG. 8, the PFC circuit 100 has minimum AC line current distorion during phase transition when one channel is shed (see 903).

While specific embodiments of the present invention have been provided, it is to be understood that these embodiments are for illustration purposes and not limiting. Many additional embodiments will be apparent to persons of ordinary skill in the art reading this disclosure.

What is claimed is:

1. In an interleaved power factor correction (PFC) circuit with a plurality of channels providing input power to a load, a method comprising:
   shedding a first channel in the plurality of channels when a compensation voltage indicative of an output power of the PFC circuit reduces to a value below a phase shedding threshold, wherein ON time of a second channel in the plurality of channels is increased to compensate for loss of input power provided by the first channel to the load, the first and second channels operating out of phase;
   adding the first channel to provide input power to the load when the compensation voltage increases to a value above a phase adding threshold, wherein ON time of the second channel is reduced to compensate for additional input power provided by the first channel to the load;
   detecting when an input AC line voltage to the PFC circuit crosses zero; and
   allowing the shedding and the adding of the first channel to occur only during a time the AC line voltage is zero.

2. The method of claim 1 wherein the first and second channels operate 180 degrees out of phase.

3. The method of claim 1 wherein the compensation voltage is generated by an error amplifier comparing output voltage of the PFC circuit to a reference.

4. The method of claim 1 further comprising comparing the compensation voltage to hysteresis thresholds of a comparator to determine whether to shed or add the first channel.

5. The method of claim 4 wherein the phase shedding threshold is a lower hysteresis threshold of the comparator and the phase adding threshold is a higher hysteresis threshold of the comparator.

6. The method of claim 4 wherein allowing the shedding and the adding of the first channel to occur only during the time the AC line voltage is zero comprises:
   gating an output of the comparator using a flip flop that has a clock input clocked by a zero-crossing detector circuit that detects zero crossing of the AC line voltage.

7. A method of performing phase management in an interleaved power factor correction (PFC) circuit, the method comprising:
   using a first channel and a second channel of the interleaved PFC circuit to generate input power to a load, the first and second channels operating out of phase;
   shedding the second channel to prevent the second channel from providing input power to the load at a first window of time;
   adding the second channel back into operation to continue providing input power to the load at a second window of time after the first window of time;
   detecting zero crossings of an AC line source input to the interleaved PFC circuit, wherein the shedding and the adding of the second channel can only occur when the AC line source crosses zero.

8. The method of claim 7 wherein the first and second channels operate 180 degrees out of phase.

9. The method of claim 7 wherein the first channel and the second channel comprise voltage converters connected in parallel.

10. The method of claim 9 wherein the voltage converters comprise boost converters.

11. The method of claim 7 further comprising:
   disabling a phase management comparator configured to compare a compensation voltage to a reference when the AC line source is not at zero.

12. The method of claim 11 wherein the compensation voltage is generated by an error amplifier comparing a monitored output voltage to a reference voltage, the compensation voltage being used by the interleaved PFC circuit to control pulse width modulation of the first and second channels.

* * * * *